United States Patent
Parker

[15] 3,668,845
[45] June 13, 1972

[54] LAWN MOWER APPARATUS

[72] Inventor: James M. Parker, Deerfield, Ill.

[73] Assignee: Parkton Corporation, Alsip, Ill.

[22] Filed: March 9, 1970

[21] Appl. No.: 17,753

[52] U.S. Cl. ............................................. 56/11.6, 56/16.9
[51] Int. Cl. ..................................................... A01d 35/26
[58] Field of Search ..................... 56/11.4, 11.5, 11.6, 11.7, 56/11.8, 16.9, 17.1, 17.4

[56] References Cited

UNITED STATES PATENTS

| | | | |
|---|---|---|---|
| 2,676,447 | 4/1954 | Asbury | 56/16.9 |
| 2,771,730 | 11/1956 | True | 56/11.6 |
| 2,791,875 | 5/1957 | Faas | 56/17.4 |
| 2,909,021 | 10/1959 | McLane | 56/16.9 |
| 3,490,213 | 1/1970 | Pinto | 56/16.9 |
| 3,183,652 | 5/1965 | Pratt | 56/17.1 |
| 3,236,037 | 2/1966 | Porterfield | 56/16.9 |
| 3,304,700 | 2/1967 | Barber | 56/11.6 |

*Primary Examiner*—Russell R. Kinsey
*Attorney*—Ronald L. Engel, Daniel W. Vittum, Jr., Gomer W. Walters, John A. Waters, James M. Amend and Jay G. Taylor

[57] ABSTRACT

An improved rotary lawn mower having a self-contained power take-off arranged in one corner of the forward edge of the mower deck. An auxilliary unit, having a blade driven by a pulley and a belt extending to the power take-off, is supported from the deck and is movable between a trimming position in which the blade is substantially horizontal and an edging position in which the blade is substantially vertical. A cam means automatically compensates for distance changes between the pulley and the power take-off as the unit is moved between the trimming and edging positions.

18 Claims, 10 Drawing Figures

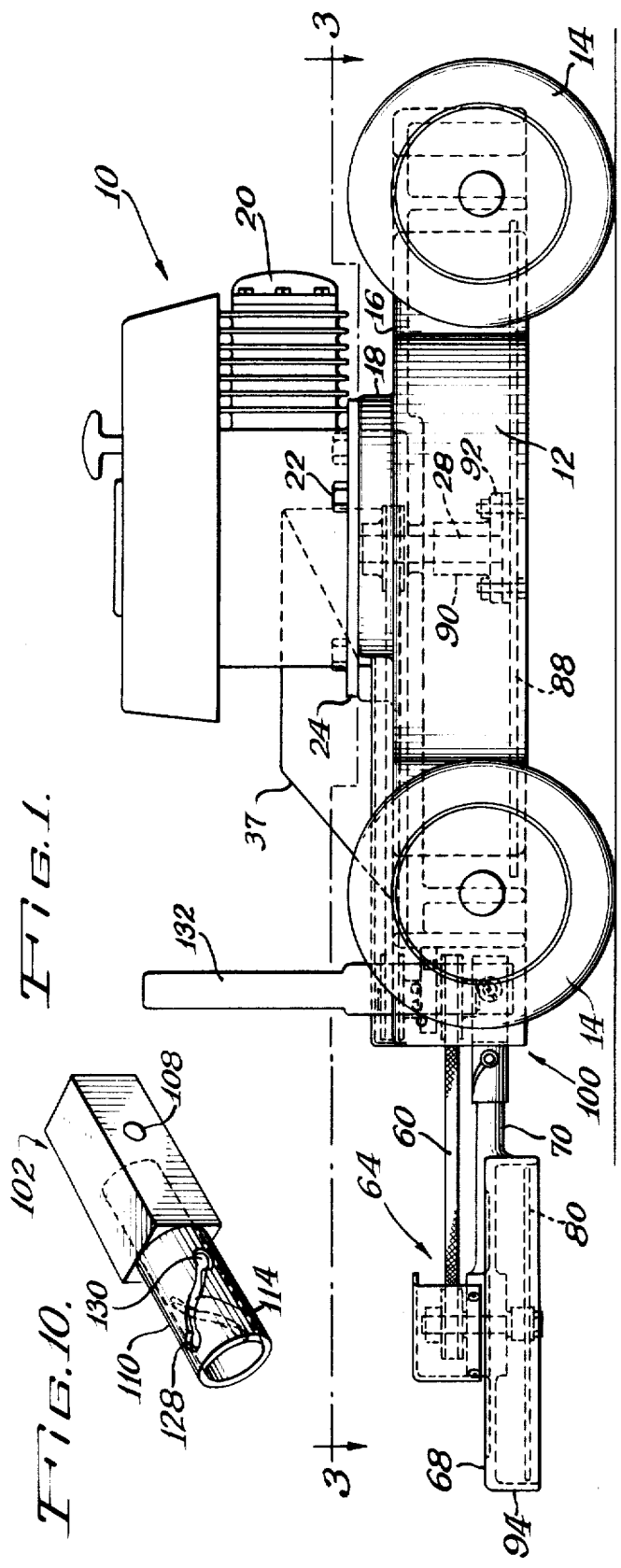
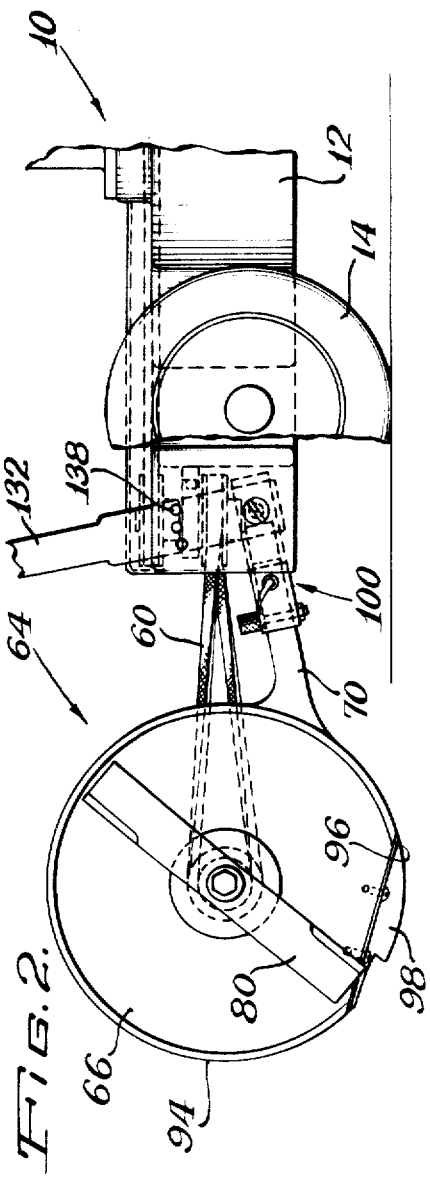

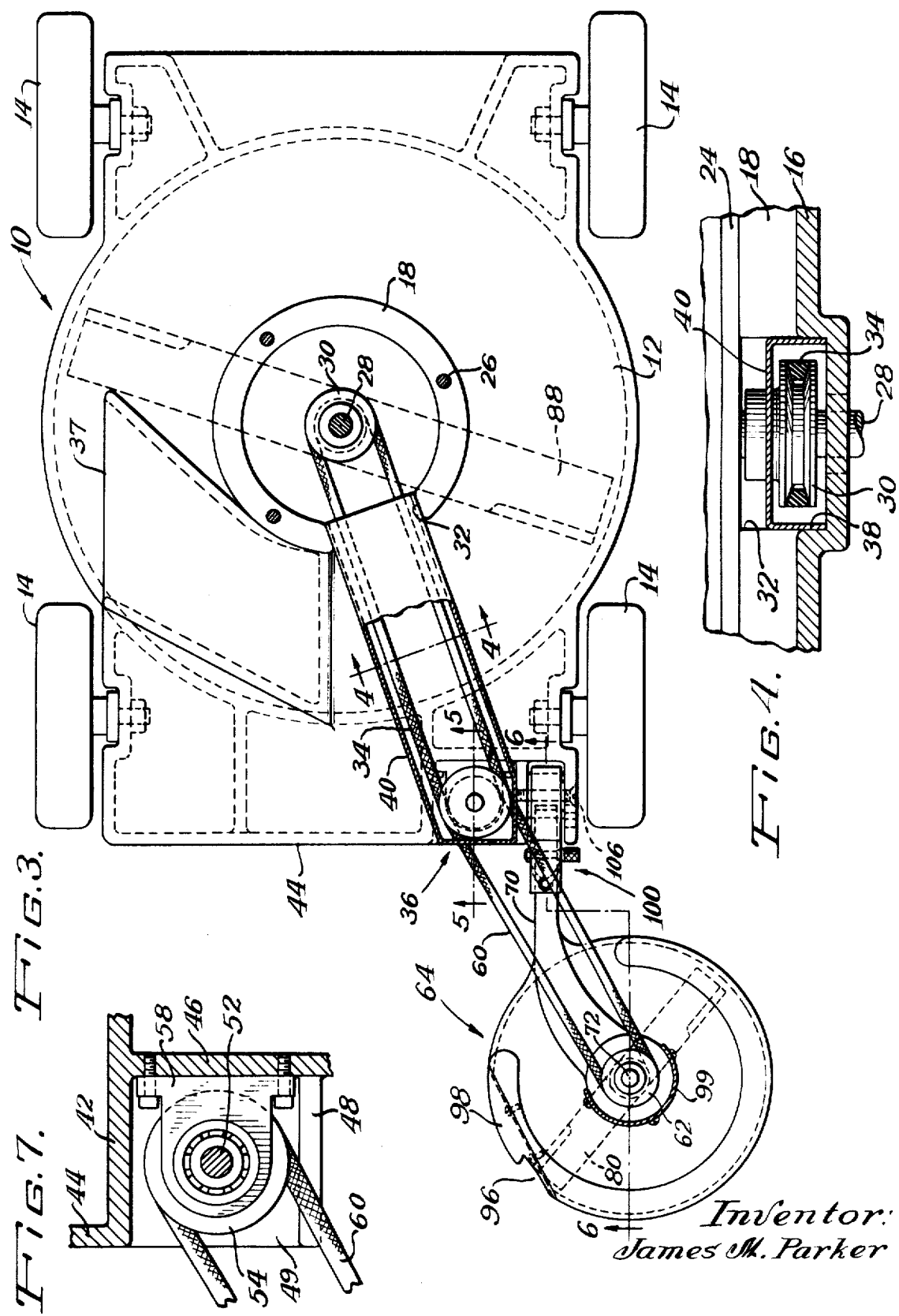

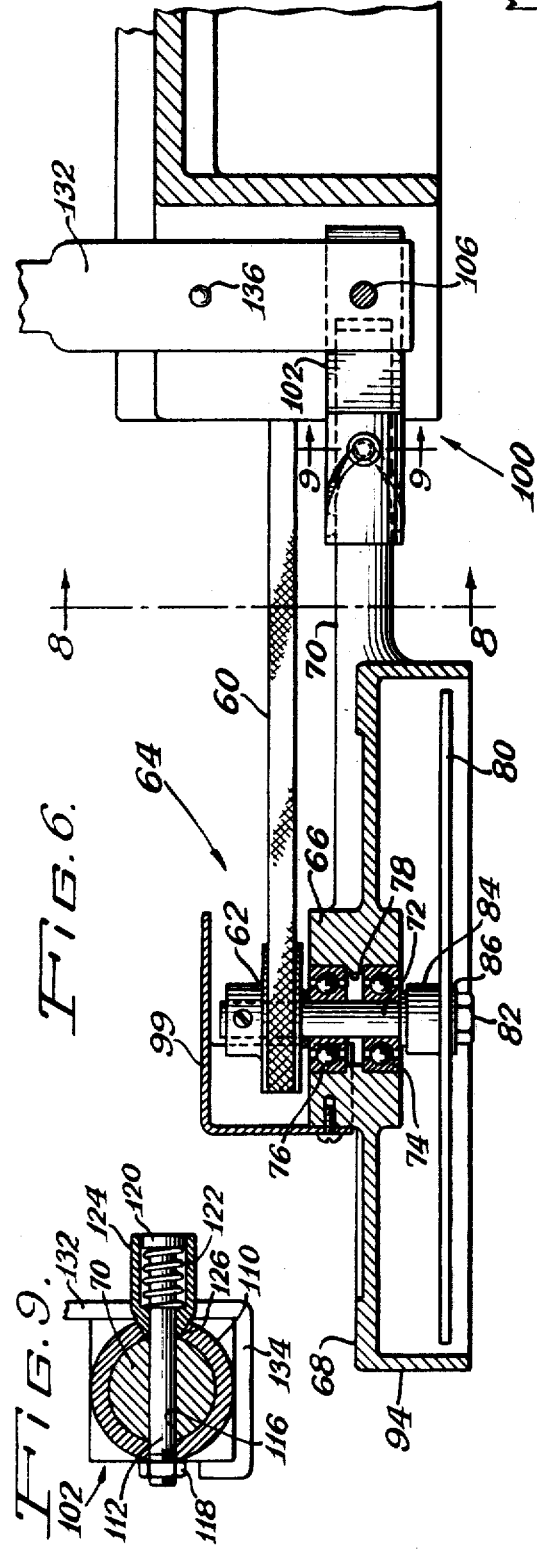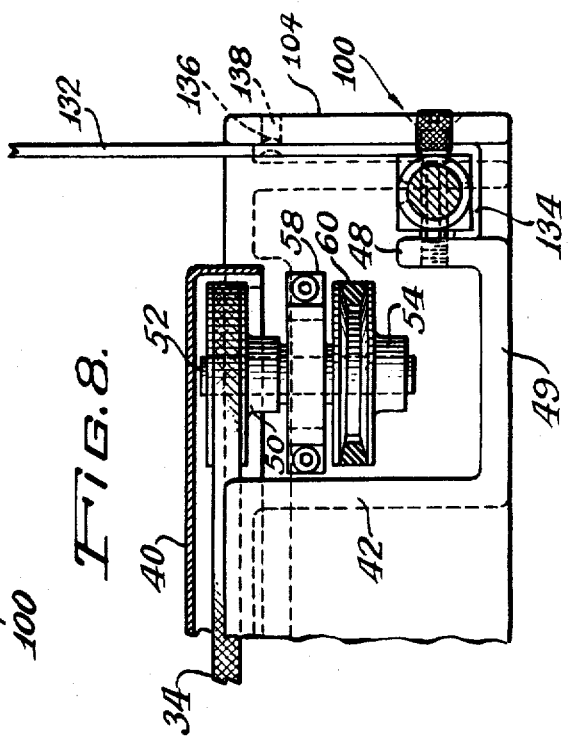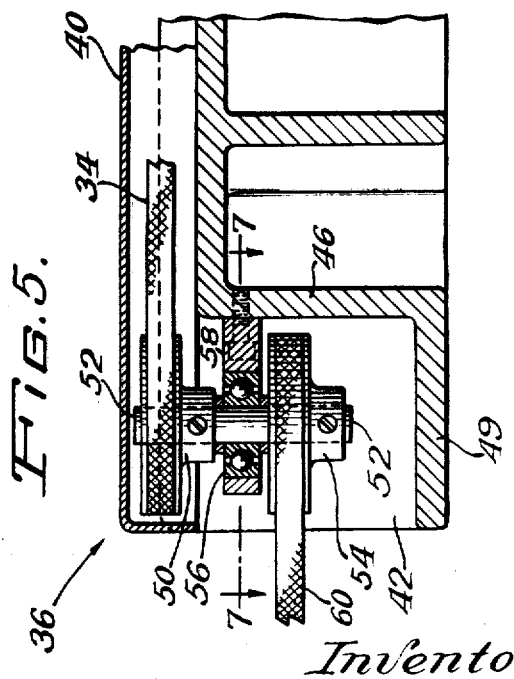

LAWN MOWER APPARATUS

This invention relates generally to lawn mowers and more particularly to a power take-off for a rotary lawn mower and to an auxiliary unit driven by the power take-off, which unit is capable of functioning as both an edger and a trimmer.

Many attempts have been made in the prior art to provide an edge and/or a trimmer attachment for lawn mowers. These prior art devices were unacceptable because they were designed to be attached to or suspended from an otherwise conventional mower. As such, these prior art devices could not be easily installed or removed, were difficult or cumbersome to adjust for proper operation, often were mounted in a manner which adversely affected the operation of the mower itself, and frequently encountered operational problems.

It is, therefore, an object of the present invention to provide a lawn mower which is capable of both edging and trimming, but which is devoid of the prior art deficiencies mentioned above.

It is also an object of this invention to provide a lawn mower which is designed for and includes a power take-off means for driving auxiliary equipment.

It is another object of this invention to provide a power take-off for a lawn mower which is a permanent and integral part of the mower, which is shielded to permit safe operation of the mower regardless of whether or not the power take-off is being utilized to drive auxiliary equipment, and which is arranged and positioned to achieve optimum operation of the driven auxiliary unit.

It is another object to provide an auxiliary unit which can be utilized for both edging and trimming and which may be easily mounted on and removed from the mower, and which, when so mounted, can be readily positioned for either the edging or trimming operation.

These and other objects of the present invention, and many of its attendant advantages, will become readily apparent from the following description and the accompanying drawings, wherein:

FIG. 1 is a side elevational view of a lawn mower embodying the present invention;

FIG. 2 is a side elevational view of the mower shown in FIG. 1, with portions broken away and eliminated, illustrating the auxiliary unit in its edging position;

FIG. 3 is a top plan view, with the engine eliminated, of the mower shown in FIG. 1;

FIG. 4 is a cross-sectional view taken on line 4—4 of FIG. 3;

FIG. 5 is a cross-sectional view taken on line 5—5 of FIG. 3;

FIG. 6 is a cross-sectional view taken on line 6—6 of FIG. 3;

FIG. 7 is a cross-sectional view taken on line 7—7 of FIG. 5;

FIG. 8 is a cross-sectional view taken on line 8—8 of FIG. 6; and

FIG. 9 is a cross-sectional view taken on line 9—9 of FIG. 6.

FIG. 10 is a perspective view of the pivot block of the present invention.

Referring now to FIGS. 1 and 3, there is shown a walk-behind mower, indicated generally at 10, provided with a deck or housing 12 to which rotatable, ground engaging wheels 14 are secured in a conventional manner. The upper surface 16 of the deck 12 is provided with a collar 18. This collar preferable extends approximately 1 inch above the upper deck surface 16 and is adapted to secure the engine 20 to the deck 12, by means of fasteners, such as bolts 22 for example, passing through a flange 24 formed on the engine and threadedly engaging tapped holes 26 in the collar 18. The output shaft 28 of the engine 20 extends downward and has a pulley 30 secured thereon. The collar 18 has an opening or slot 32 which is slightly wider than the outer diameter of the pulley 30 and is located in the left front corner of the deck, as viewed by an operator walking behind the mower 10. This arrangement permits a belt 34 to extend around the pulley 30 and toward the power take-off or power cell, indicated generally at 36. The upper deck surface 16 is provided with a groove or channel 38, as best seen in FIG. 4. The channel 38 is coincident with the walls of the collar formed by the slot 32 and at least partially accepts the belt 34. A safety shield or cover 40, which is U-shaped in cross-section and preferrably is made of plastic material, is frictionally retained within the channel 38 and extends from the slot 32 in the collar 18 to the top of the power cell 36. The belt 34 is completely concealed from the operator when the safety cover 40 is so positioned in the channel 38. By positioning the belt 34 vertically so that at least a portion thereof is below the upper deck surface 16, a low profile is achieved, and in addition, any lateral deflections of the belt against the cover 40 will be resisted by the walls of the channel 38 thereby preventing the cover from being accidentally dislodged from the channel 38.

The power cell 36 is located on the front of the mower 10 and toward the side opposite to the discharge 37. In the embodiment shown in the drawings, the power cell is positioned on the left front corner as viewed by an operator walking behind the mower. The power cell 36 is formed by an inner vertical wall 42 extending rearward from the front wall 44 of the deck 12 and downward from the upper surface 16 of the deck 12, a vertical rear wall 46 and an outer vertical wall 48 substantially parallel to the front wall 42, as best shown in FIGS. 7 and 8. A horizontal lower wall 49 interconnects these three vertical walls 44, 46 and 48. The outer vertical wall 48 preferrably extends upward from the lower wall 49 only a short distance for reasons explained hereinafter. An input pulley 50 accepts the main belt 34 and is secured to a vertical shaft 52. An output pulley 54 is also secured to the shaft 52 for rotation therewith. A bearing 56, cantilevered from the rear wall 46 by means of a support bracket 58, rotatably mounts the shaft 52 between the two pulleys 50 and 54. The bracket 58 locates these pulleys within the cell 36 defined by the three walls 42, 46 and 48 and rearward of the plane of the front wall 44. The input pulley 50 extends slightly above the upper deck surface 16 in order to accept the main belt 34, but is capable of being enclosed by the safety cover 40, which extends over the power cell 36. The output pulley 54 is spaced from the vertical walls by the bracket 58 so that an auxiliary drive belt 60 can be passed between the pulley 54 and these walls. The drive belt 60 extends around the output pulley 54 and a driven pulley 62 on the auxiliary unit 64. The outer vertical wall 48 terminates below the belt groove in the pulley 54 so that installation and removal of the belt 60 from the pulley is made easier.

The auxiliary unit 64 comprises a frame member 66, which includes a generally circular member 68 and an arm member 70, preferably formed integral therewith, and a shaft 72 which is rotatably supported in a pair of bearings 74 and 76 pressed into a counterbored opening 78 in the center of the circular member 68. The driven pulley is secured to the upper end of the shaft 72, as viewed in FIG. 6, and an auxiliary blade 80 is secured to the lower end of the shaft 72. Any conventional means may be employed to secure the blade 80, such as a bolt 82 engaging a threaded hole in the shaft 72 to hold the blade 80 between a spacer 84 and a washer 86. The spacer 84 positions the auxiliary blade 80, with the unit 64 in its trimmer position as shown in FIG. 1, substantially on the same level as the mower blade 88. This blade 88 is secured to the engine output shaft 28 by a spacer 90 having a flange 92 to which the blade 88 is bolted.

The circular frame member 68 has a lip portion 94 extending therearound. An opening 96 in the lip portion 94 is provided on that side of the unit 64 toward the mower 10 when the unit is in trimming position so that the cuttings discharged from the unit will be swept by the mower blade 88. A guide member 98 is secured to the frame member 68 in the opening 96 to aid in guiding the unit when used as an edger. A guard 99 is secured to the frame member 66 and encircles the driven pulley 62 to the extent possible and still permit the belt 60 to have unobstructed access to this pulley.

The arm member 70 is detachably mounted on the mower 10 by means of a dual axis support means, indicated generally at 100. A pivot block 102 is supported between the outer wall 48 of the power cell 36 and a parallel exterior wall 104. A pivot shaft or bolt 106 extends through an opening in the exterior wall 104, through a bore 108 in the pivot block 102 and threadedly engages a threaded bore in the outer wall 48. This bolt defines a generally horizontal, transverse pivot axis for the pivot block, and preferrably it is located slightly below the output pulley 54 and intersects the centerline of the shaft 52. This relationship causes the pulley 62 to move away from the output pulley 54 when the unit 64 is lowered, in a manner to be described hereinafter. This increase in distance causes the tension in the drive belt 60 to increase, which tension assists in counterbalancing the weight of the unit 64 and assists in the manual raising of the unit 64. The pivot block 102 is provided with a tubular extension 110 into which the arm member 70 can be inserted. A follower pin 112 can be inserted through diametrically opposed cam slots 114 in the tubular extension 110 and through a crossbore 116 in the arm member 70. A nut 118 threadedly engages one end of the follower pin 112 and a head portion 120 is formed on the other end of the pin 112. A compression spring 122 is trapped between the head portion 120 and a lock member 124. The lock member 124 is provided with a taper portion 126 which is engageable with enlarged circular end portions 128 and 130 formed in the cam slots 114.

It will be apparent that the lock member 124 will retain the arm member 70, and hence the unit 64 in its trimmer position when the taper portion 126 is positioned in the circular end portion 130 of the cam slots 114 and in its edger position when the taper portion 126 is positioned in the end portion 128. Pulling the lock member 124 against the bias of the spring 122 removes the taper portion 126 from the end portions 128, 130 permitting the frame member 66 to be pivoted about the axis of the tubular extension 110 between the trimming and edging positions for the unit 64. The follower pin 112 engaging the cam slots 114 will cause the arm member 70 to move toward the mower 10 as the unit 64 is rotated toward its trimming position and away from the mower 10 as the unit 64 is rotated toward its edging position. Such inward and outward movement is necessary because the arm member 70 is off-set with respect to both the shafts 52 and the pulley 62. As can be seen in FIGS. 3 and 6, the axis of the tubular extension 110 is to the inside or above the center of the shaft 52 in plan view and below the plane of the driven pulley 62 in elevation. This relationship causes the distance between the two pulleys 54 and 62 to lengthen as the unit is moved to a vertical or the edger position. Even though the drive belt 60 is twisting and thereby tending to shorten, there would be slack in this belt if there were no compensation for this distance change. The cam slots 114 and follower pin 112 provide this compensation and maintain a substantially constant belt tension due to the axial length of the cam slots 114, which are designed to move the driven pulley 62 outward just the necessary amount to compensate for the belt twist and the changed physical relationship between the driven and output pulleys.

The vertical height of unit 64 is adjustable by means of a handle 132, through which the pivot bolt 106 also passes. The handle 132 is provided with a U-shaped portion 134 which tightly engages the pivot block 102 so that rotation of the handle about the pivot bolt 106 will effect rotation of the pivot block 102 therewith. The handle 132 is provided with a dimple 136 extending toward the exterior wall 104. A plurality of recesses or holes 138 in the exterior wall 104 are arranged in an arc about the pivot bolt 106 and are engageable by the dimple 136. The dimple 136 is, therefore, capable of retaining the handle 132, and hence the unit 64, in a plurality of positions. As previously described, the pivot bolt 106 is positioned beneath the output pulley 54 so that the tension in drive belt 60 will increase as the unit 64 is pivoted counterclockwise as viewed in FIG. 2. The tension is therefore maximum when the unit 64 has been lowered for use as an edger. If the auxiliary blade should then encounter an obstruction sufficient to dislodge the dimple 136, the belt tension would automatically raise the unit 64.

It should be noted that the arm member 70 is positioned to the inner side of the shaft 72, when the unit 64 is in its trimmer position. Since the pivot block 102 is located in the extreme left front corner of the deck 12, the blade 80 can extend laterally beyond the wheels. This permits accurate and complete trimming with the clippings being discharged into the path of the main mower blade 88 so that these clippings may in turn be expelled into a conventional bag or catcher, not shown, attached to the discharge 37. It should also be noted that pulleys 54 and 62 are in the same plane in the trimming position. Since these pulleys are at the same elevation, there will be no tendency for the drive belt 60 to be dislodged from the pulley grooves, i.e. the belt will not "run off" the pulleys. Similar consideration has been given to the operation of the drive belt 60 when the unit 64 is in its edger position. The off-set of the arm member 70, as described previously, causes the driven pulley 62 to be oriented in a plane which passes through the center of the shaft 52. This is a desirable relationship for precluding belt "run off" and is optimum when the shaft 72 lies in the same plane as the pulley 54. Such a condition is obtained when the unit is positioned for edging and is then lowered. Maximum power is being transmitted through the drive belt 60 during the edging operation and it is under such conditions that the belt would have the greatest tendency to dislodge. Hence, the optimum relationship is achieved when the belt has the greatest likelihood of becoming dislodged.

Removal of the unit 64 from the mower 10 requires only turning off the nut 118 and withdrawing the pin 112. Then, once the drive belt 60 has been removed from the output pulley 54, the arm member 70 may be withdrawn from the extension 110. Reinstallation would be simply the reverse of this procedure.

Obviously many modifications and variations of the present invention are possible in the light of the above teachings. It is therefore to be understood that within the scope of the appended claims, the invention may be practiced otherwise than as specifically described.

What is claimed is:

1. In combination with a lawn mower having a power take-off, an auxiliary unit capable of functioning in one position as a trimmer and in another position as an edger, said unit comprising:
   a frame structure;
   a pulley rotatably mounted on the frame structure;
   a belt means extending between the power take-off and the pulley;
   an auxiliary blade operatively connected to the pulley for rotation therewith;
   mounting means carried by the lawn mower and capable of supporting said frame in either of said positions;
   and cam means associated with said frame for moving said frame toward and away from the power take-off as the unit is moved between said one position and said another position;
   whereby substantially constant tension may be maintained in the belt means.

2. In the combination according to claim 1, wherein said cam means comprises:
   a spiral groove in one of said frame and mounting means;
   and pin means carried by the other of said frame and mounting means and engagable with said groove.

3. In the combination according to claim 1, and further comprising:
   lock means associated with the mounting means for holding said frame in both of said positions.

4. In the combination according to claim 3, wherein said lock means comprises:
   sleeve means carried by said pin means;
   enlarged opening means formed at each end of said groove and capable of accepting said sleeve means;
   and bias means interposed between said sleeve means and said pin means for urging said sleeve means into engagement with said opening means.

5. In the combination according to claim 1, and further comprising:

pivot means rotatably securing the mounting means on the lawn mower;

handle means connected to the mounting means for rotating the mounting means about the pivot means;

detent means associated with the mower and handle means for selectively positioning said mounting means.

6. In the combination according to claim 5, wherein:

said detent means is capable of retaining the mounting means in at least two selective positions, one raised for use with the unit in trimming position and another lowered for use with the unit in edging position;

said pivot means being positioned on the mower so that movement of the handle means toward the lowered position increases the tension in the belt means;

whereby manual release of the detent means urges the mounting means toward the raised position.

7. In a rotary lawn mower having a deck, ground-engaging wheels rotatably mounted on the deck and an engine including an output shaft, and a cutting blade mounted on the output shaft; an improved power take off system comprising:

first pulley means affixed to the output shaft;

encompassing means enclosing said first pulley and having a belt slot in one side thereof;

a substantially enclosed cell formed in one corner of the deck, said cell having a first and a second opening therein;

an auxiliary shaft rotatably mounted in the cell;

second pulley means affixed to the auxiliary shaft;

belt means extending around said first and second pulley means, and extending through the first opening in said cell through said belt slot in the encompassing means;

enclosure means enclosing said belt means, said enclosure means sealably communicating between said first opening and said belt slot;

third pulley means secured to the auxiliary shaft adjacent said second opening and said third pulley means being entirely confined within the cell; and an external auxiliary power utilizing unit in operable connection with said third pulley through said second opening.

8. An improved power take-off system as claimed in claim 7, wherein said encompassing means comprises:

a collar formed on the deck and extending upward therefrom;

and fastening means securing the engine to the collar.

9. An improved power take-off system as claimed in claim 8 wherein said enclosure means comprises:

a channel formed in the upper surface of the deck and extending between said first opening in said cell and said belt slot in said encompassing means;

said first and second pulley means being in a common plane and at an elevation relative to the channel to permit at least a portion of the belt means to be positioned within the channel;

cover means having a shape in plane view complementary with the cell and extending between said first opening and said belt slot, said cover means being frictionally retained within the channel thereby enclosing said belt means.

10. An improved power take-off system as claimed in claim 10 wherein said external auxiliary power utilizing unit comprises:

mounting means carried on the deck;

a frame detachably secured to the mounting means;

a fourth pulley means rotatably mounted on said frame;

a second belt means extending around the third and fourth pulley means; and an auxiliary blade operatively connected to the fourth pulley means.

11. An improved power take-off system as claimed in claim 10, wherein said frame is pivotally secured to the mounting means so that it is movable between a trimming position in which said blade is horizontal and an edging position in which said blade is vertical.

12. An improved power take-off system as claimed in claim 11, and further comprising:

compensating means interposed between the mounting means and said frame for moving the fourth pulley means relative to the third pulley means as said frame is moved between said trimming and edging positions to automatically maintain substantially constant tension in said second belt means.

13. An improved power take-off system as claimed in claim 12, wherein said third and fourth pulley means lie in a common plane when said frame is in its trimming position, and said fourth pulley means and the axis of rotation of said third pulley means lie in a common plane when said frame is in its edging position.

14. An improved power take-off system as claimed in claim 13, wherein said compensating means comprises:

a spiral groove in one of said frame and mounting means;

and a pin means carried by the other of said frame and mounting means, and being capable of engagement with said groove.

15. An improved power take-off system as claimed in claim 14, wherein said compensating means further comprises:

sleeve means carried by the pin means;

bias means interposed between the pin means and the sleeve means for urging the sleeve means toward said groove;

and enlarged openings formed at each end of the said groove complementary to and capable of receiving the sleeve means to lock said frame in either of its said positions.

16. An improved power take-off system as claimed in claim 15, and further comprising:

pivot means supporting the mounting means on the deck;

handle means connected to the mounting means for pivoting the mounting means about the pivot means;

and detent means associated with the mower and handle means for selectively positioning said mounting means.

17. An improved power take-off system as claimed in claim 16, wherein:

said detent means is capable of retaining the mounting means in at least two selective positions, one raised for use with the unit in the trimming position and another lowered for use with the unit in the edging position;

said pivot means being positioned on the mower so that movement of the handle means toward the lowered position increases the tension in the belt means;

whereby manual release of the detent means urges the mounting means toward the raised position.

18. An improved power take-off system as claimed in claim 17, wherein the frame structure is mounted to the mounting means so that the auxiliary blade is positioned in front of the deck and extending beyond the side of the deck when the auxiliary blade is in the horizontal position.

* * * * *